United States Patent
Hobson et al.

[11] Patent Number: 5,966,650
[45] Date of Patent: Oct. 12, 1999

[54] DETECTING MOBILE TELEPHONE MISUSE

[75] Inventors: Phillip William Hobson, Bishops Stortford; Paul Colin Barson, Hemel Hempstead; Gill McAskie, Hull, all of United Kingdom

[73] Assignee: Northern Telecom Limited, Montreal, Canada

[21] Appl. No.: 08/894,198
[22] PCT Filed: Jul. 12, 1996
[86] PCT No.: PCT/GB96/01663
   § 371 Date: Aug. 13, 1997
   § 102(e) Date: Aug. 13, 1997
[87] PCT Pub. No.: WO97/03533
   PCT Pub. Date: Jan. 30, 1997

[30] Foreign Application Priority Data

Jul. 13, 1995 [GB] United Kingdom ............... 9514381

[51] Int. Cl.⁶ .............. H04M 1/66; H04M 1/68; H04M 3/16
[52] U.S. Cl. .............................. 455/410; 706/12
[58] Field of Search .................... 455/410, 411, 455/405, 67.7; 370/244; 379/10, 13, 15, 111, 112, 114, 189; 706/12, 45, 10, 20; 707/104; 705/1; 340/825.3, 825.31, 825.32

[56] References Cited

U.S. PATENT DOCUMENTS 5,819,226  10/1998  Gopinathan et al. ................... 705/1

Primary Examiner—Dwayne D. Bost
Assistant Examiner—Raymond B. Persino
Attorney, Agent, or Firm—Lee, Mann, Smith, McWilliams, Sweeney & Ohlson

[57] ABSTRACT

An arrangement for the detection of fraudulent use of a telephone subscriber's instrument in a mobile telephone system includes an input preprocessor (110), a neural network engine (111) coupled to the preprocessor, and an output postprocessor (112) coupled to the neural network engine. The preprocessor determines for each subscriber a first long term calling profile, a second short term calling profile, and a subscriber profile pattern comprising the difference between the first and second profiles. Each calling profile and subscriber profile pattern comprises a set of values for a respective set of call attributes. The neural network engine comprises a self organizing map trained to effect pattern recognition of the subscriber profile patterns and a multilayer perceptron adapted to determine for each recognized pattern a value indicative of the probability of a fraud being associated with that pattern.

11 Claims, 7 Drawing Sheets

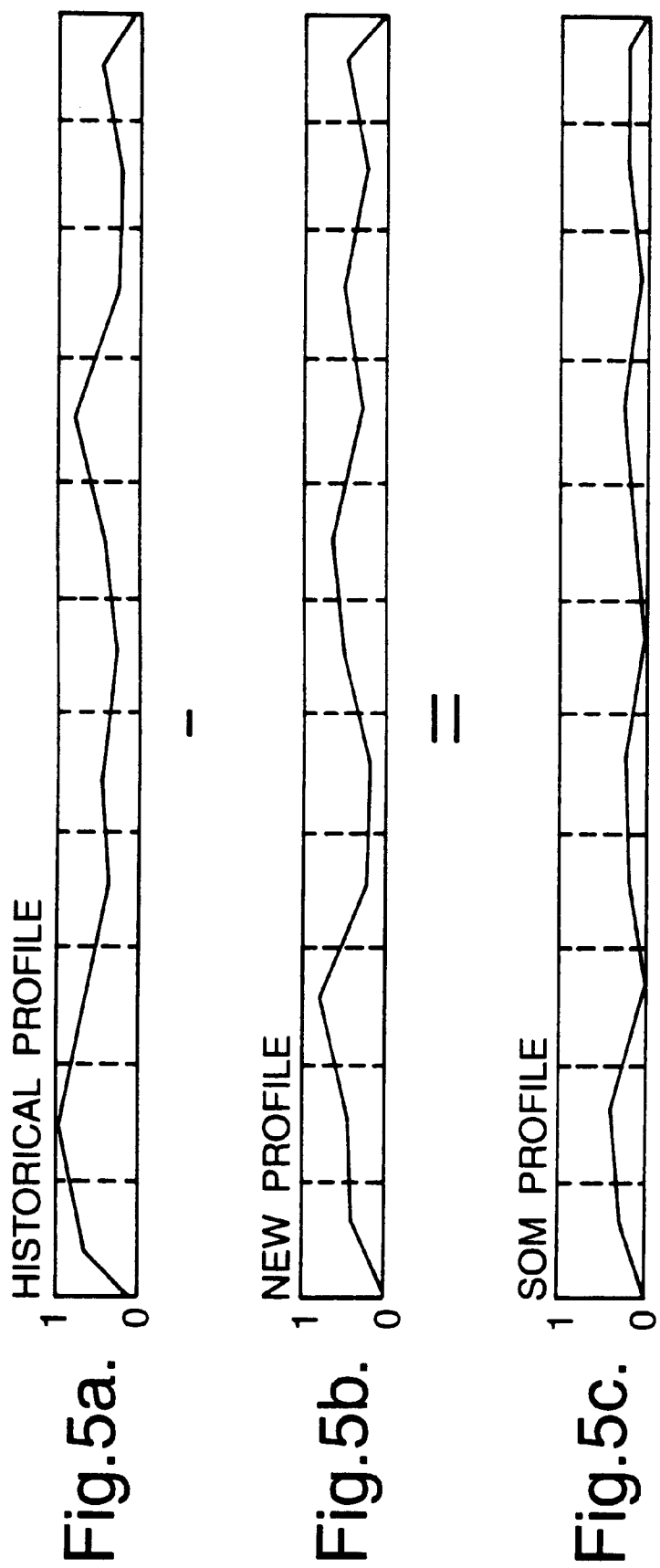
Fig.5a. HISTORICAL PROFILE
Fig.5b. NEW PROFILE
Fig.5c. SOM PROFILE

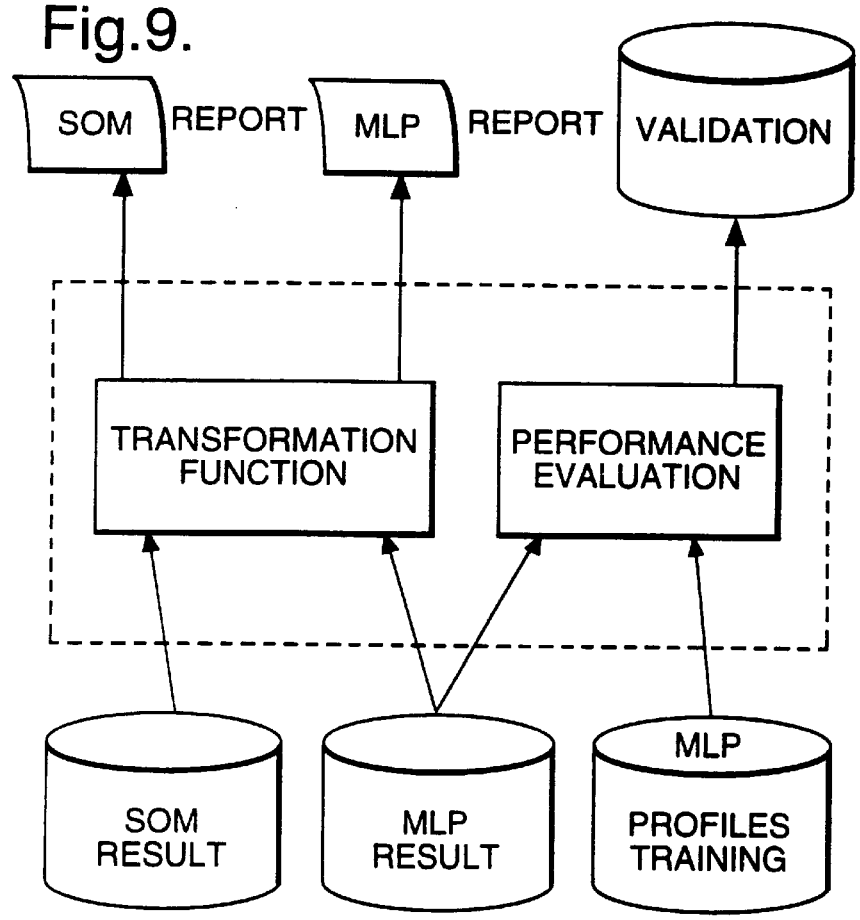
Fig.9.
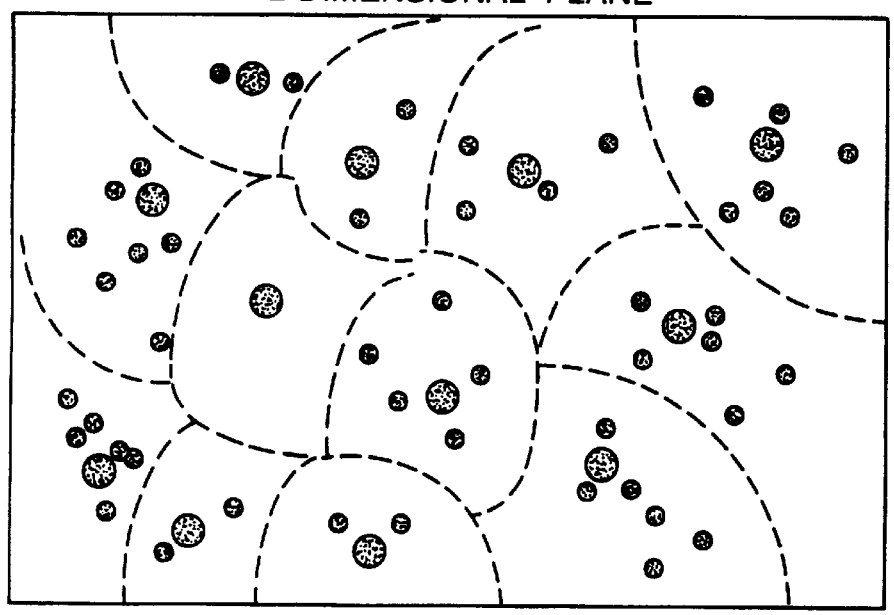
Fig.10. 2-DIMENSIONAL PLANE

DETECTING MOBILE TELEPHONE MISUSE

This invention relates to an apparatus and method for the detection of fraudulent use of mobile telephones.

BACKGROUND OF THE INVENTION

Mobile telephone fraud is the unauthorised use of a telecommunications network accomplished by deception via the wireless medium. This deception may take a number of forms which are generally classified under the broad headings of subscription fraud, theft and cloning.

Subscription fraud arises from the use of a false name and address when purchasing a mobile telephone and results in a direct loss to the service provider when a bill for usage of the telephone is unpaid.

Theft of a mobile telephone can lead to antenna misuse in the period between loss of the telephone and the reporting of that loss to the service provider. In some circumstances a mobile telephone may simply be borrowed by a fraudster who then steals air time. This particular type of theft may remain undetected for some time as it will become apparent only when the customer subsequently receives a bill.

The most serious fraud in a mobile system is that of mobile telephone cloning where the fraudster gains access to the network by emulating or copying the identification code of a genuine mobile telephone. This results in multiple occurrence of the telephone unit. The users of these clones may or may not be aware of this misuse. This fraud generally remains undetected until a customer becomes aware of unexpected items on a bill, by which time the total financial loss can be substantial.

Approaches to the problem of detecting mobile telephone fraud are described in specification No WO-A1-95/01707 and in specification No WO-A1-94/11959 both of which refer to techniques for building up an historical profile of subscriber activity so as to detect changes in that activity which may be indicative of fraudulent use.

Once illegal access has been gained to the mobile network, calls can be made at no cost to a fraudster, as either a genuine account holder is billed or the network provider is forced to write off the cost. It will be appreciated that once an identification code has been broken and a telephone has been cloned, this information can be disseminated to other fraudsters resulting in a high potential financial loss. The relatively slow response of conventional fraud detection procedures has become insufficient to address the rapid incidence of abuse of the system. It will also be appreciated that new forms of fraud are constantly coming to light and that these may not be immediately detectable by conventional techniques.

An object of the invention is to minimise or to overcome this disadvantage.

It is a further object of the invention to provide an improved apparatus and method for the detection of fraudulent use of a mobile telephone system.

SUMMARY OF THE INVENTION

According to one aspect of the invention there is provided an apparatus for the detection of fraudulent use of a telephone subscriber's instrument in a mobile telephone system, the apparatus including means for determining a long term calling profile for a said subscriber, means for determining a short term calling profile for the subscriber, means for determining the difference between the long term and short term profiles, said difference comprising a subscriber profile pattern, and a trained neural net arrangement for determining from the subscriber profile pattern a probability value for the existence of fraud in that pattern, wherein the neural net arrangement comprises a self organising map adapted to effect pattern recognition of said subscriber profile patterns, and a multilayer perceptron adapted to determine said probability value for each recognised pattern.

According to another aspect of the invention there is provided apparatus for the detection of fraudulent use of a telephone subscriber's instrument in a mobile telephone system, the apparatus including an input preprocessor, a neural network engine coupled to the preprocessor, and an output postprocessor coupled to the neural network engine, wherein the preprocessor is adapted to determine for each subscriber, from that subscriber's telephone call data, a first long term calling profile, a second short term calling profile, and a subscriber profile pattern comprising the difference between the first and second profiles, each said calling profile and subscriber profile pattern comprising a set of values for a respective set of call attributes, wherein the neural network engine comprises a self organising map trained to effect pattern recognition of said subscriber profile patterns and a multilayer perceptron adapted to determine for each recognised pattern a value indicative of the probability of a fraud being associated with that pattern, and wherein said postprocessor is arranged to order said recognised pattern according to said fraud probabilities.

According to a further aspect of the invention there is provided a method for the detection of fraudulent use of a telephone subscriber's instrument in a mobile telephone system, the method including determining a long term calling profile for a said subscriber, determining a short term calling profile for the subscriber, determining the difference between the long term and short term profiles, said difference comprising a subscriber profile pattern, and processing the pattern via a trained neural net arrangement comprising a self organising map adapted to effect pattern recognition of said subscriber profile patterns and a multilayer perceptron adapted to determine said probability value for each recognised pattern whereby to determine from the subscriber profile pattern a probability value for the existence of fraud in that pattern.

BRIEF DESCRIPTION OF THE DRAWINGS

An embodiment of the invention will now be described with reference to the accompanying drawings in which:

FIGS. 5a to 5c illustrate the generation of a customer profile from historical and recent customer data;

FIG. 9 shows a postprocessor for use in the arrangement of FIG. 1; and

FIG. 10 illustrates clustering of SOM profiles derived from the SOM neural network.

DESCRIPTION OF PREFERRED EMBODIMENT

Figure 1:
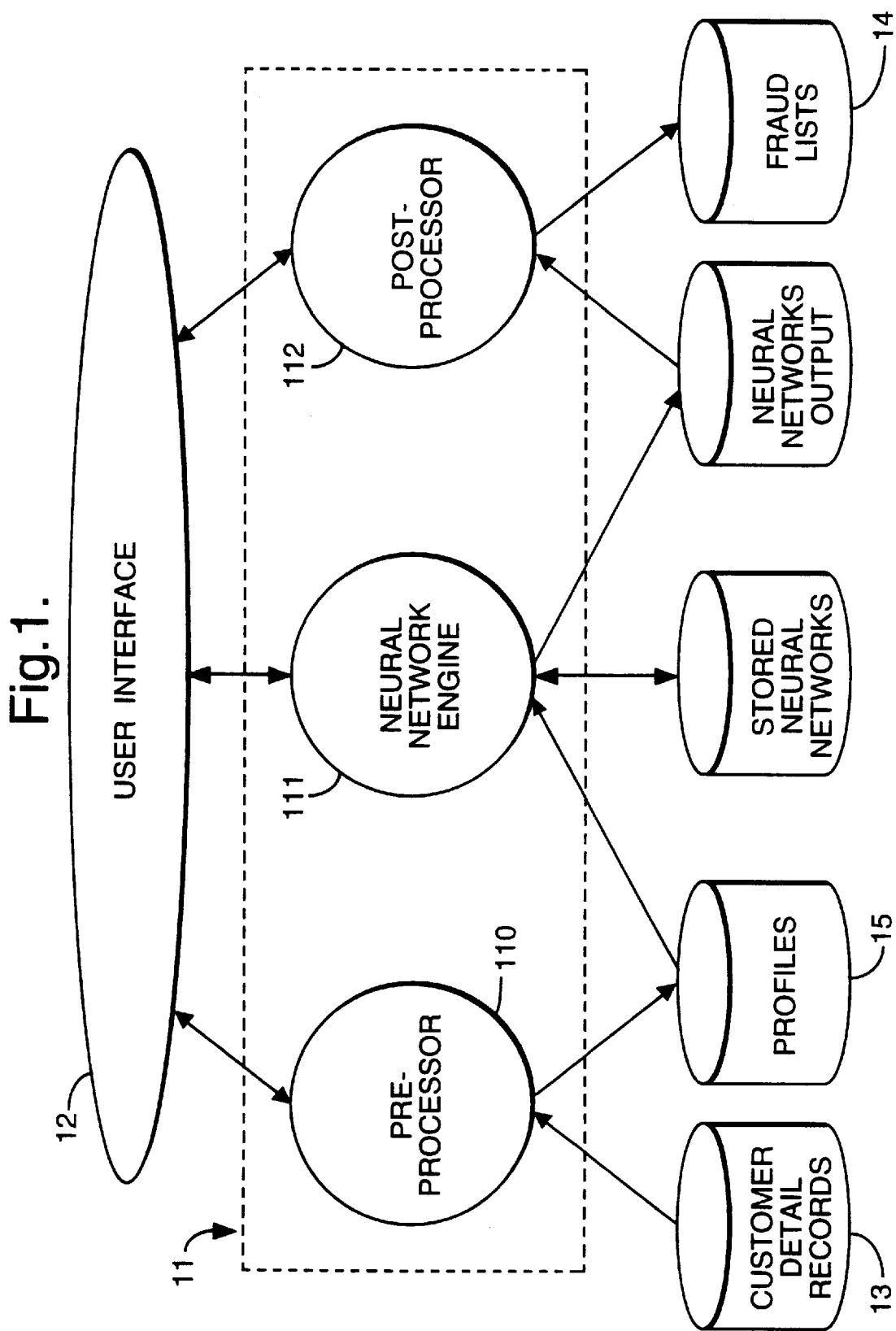
FIG. 1 is a general schematic diagram of an arrangement for the detection of fraudulent use of a mobile telephone system.

Referring to FIG. 1, the arrangement includes a processor generally indicated as 11 accessed via a user interface 12. The processor receives customers detail records 13 of calls made by customers and outputs a list of potential frauds 14 by processing and analysis of those records. As shown in FIG. 1, the processor 11 includes a preprocessor 110 which generates customer profiles 15 from the input customer data, a neural network engine 111 which performs the customer profile analysis and a post processor 112 which performs an output function.

The neural network engine 111 may incorporate a self organising map (SOM), which organises customer calling patterns into groups, and a multi-layered perceptron (MLP) which is trained to recognise potential frauds in the customer calling patterns from known cases of fraud.

Figure 2:
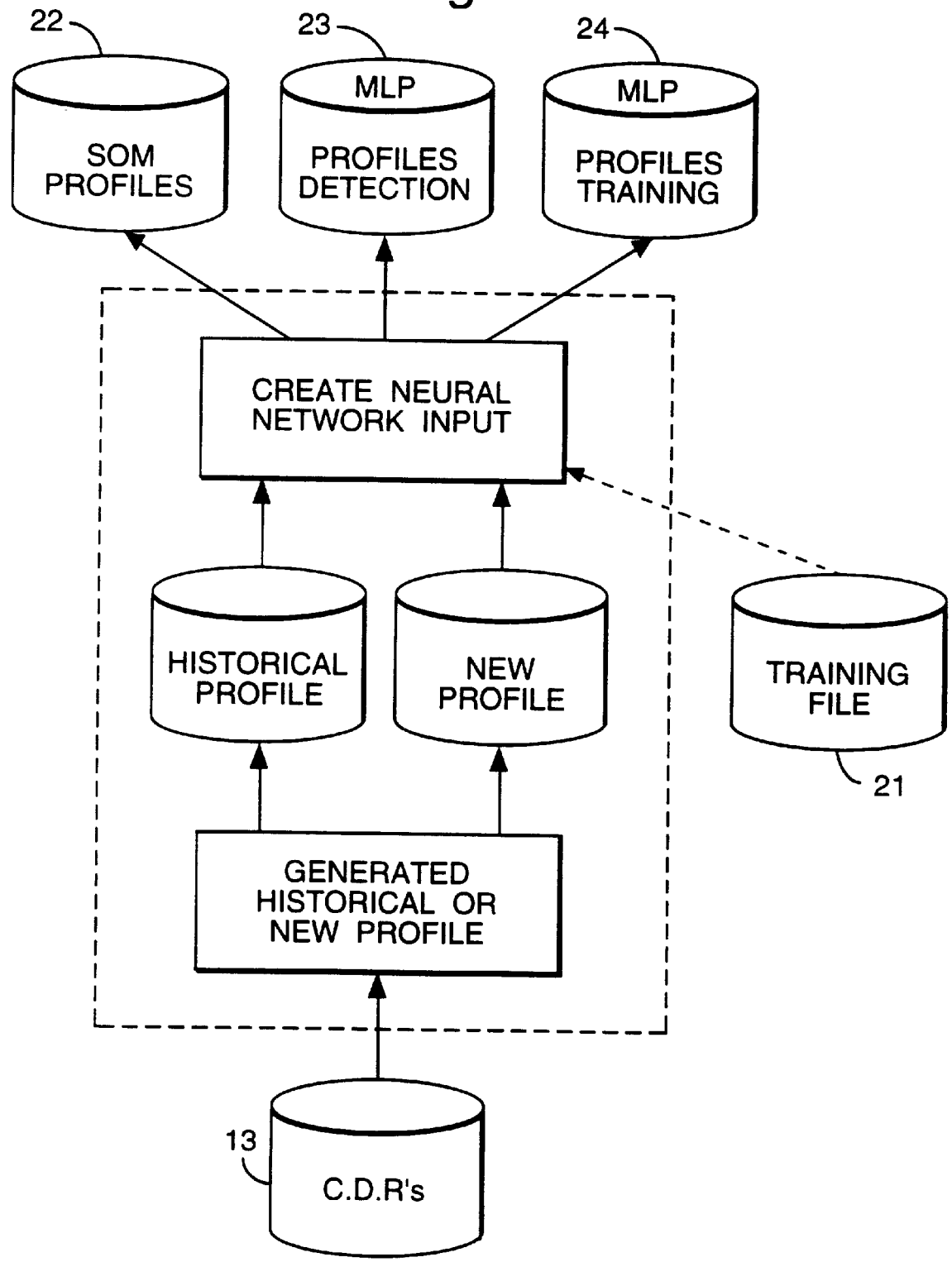
FIG. 2 shows the general construction of a preprocessor for use in the arrangement of FIG. 1.

Referring now to FIG. 2, this shows the construction of the preprocessor of the arrangement of FIG. 1. The function of the preprocessor is to transform the new data relating to customer calls into a format suitable for processing by the neural network engine. The preprocessor is also used to process information from a training file 21 into a form suitable for training the MLP.

The output of the preprocessor comprises SOM profiles 22 for the self organising map, MLP detection profiles 23 for the multi-layer perceptron (MLP) and training profiles 24 for the MLP.

A customer detail record is a log of a completed telephone call. This comprises a number of attributes, for example the following:

Billing account number.
Telephone number associated with account.
Called telephone number.
Date and time of completion of call
Duration of call.
Originating send area.
Receiving area.
Home location of the caller.
Medium of call destination i.e. land, mobile or call forward.
Units of call.
Call made to a frequently used telephone number
Distance class of call The preprocessor collects the individual CDR's for each customer and generates a customer profile record. A profile record captures a customer's calling pattern over time and is created for each customer account holder from their respective CDR's. Typically a customer's profile record comprises the following attributes or fields:

1. The time span over which the profile has been created.
2. The percentage of local calls.
3. The percentage of national calls.
4. The percentage of international calls.
5. The proportion of calls which are made to regularly used telephone numbers.
6. The number of units used.
7. The total number of calls made over a given period of time.
8. The average duration of a telephone conversation.
9. The proportion of calls made to other mobile phones as opposed to land destinations.
10. The proportion of calls which originate in the local area of the phone against those made in other districts.
11. The variation in different originating calls. This is a measurement of the number of different districts used to initiate calls.

There are two types of customer or user account profiles, an historic profile and a new profile. The historic profile captures the customer's calling behaviour over a long period of time, typically six months. It is assumed that fraudulent activity is not taking place for each historical profile during that period. Calling habits can change over time and the historical profile will thus need to be updated periodically to reflect the new calling behaviour.

Figure 3A:
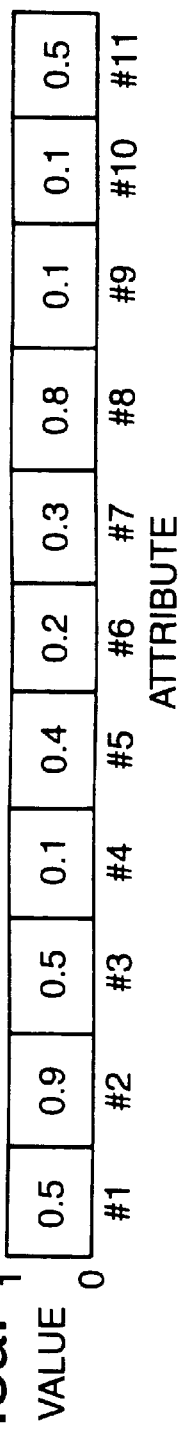
FIGS. 3a and 3b show respectively a typical user profile and a corresponding profile pattern determined by the processor of FIG. 2.
Figure 3B:
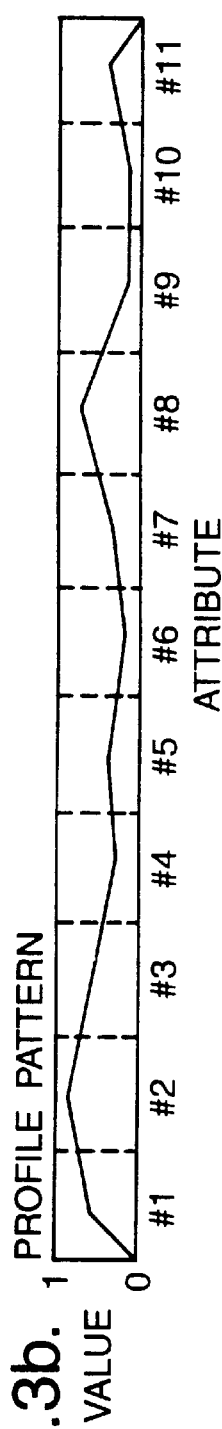

The new profile models the account holder's more recent calling behaviour. The time period could range from a matter of hours up to weeks. FIG. 3a shows a typical customer profile. The profile attributes have been normalised to values between 0–1. A profile pattern is then obtained by plotting the points of the profile for each attribute, as illustrated in FIG. 3b which shows the pattern obtained from the profile of FIG. 3a.

The output file does not have to include all the fields described above and for some applications may consist of a subset of the fields identified in the profile record. All the fields are numeric and may be subjected to mathematical transformations. Transformations alter the characteristics of a field and are used to improve the pattern recognition capabilities of the neural network by accentuating salient features. There are many functions which are suitable for this task.

Figure 4A:
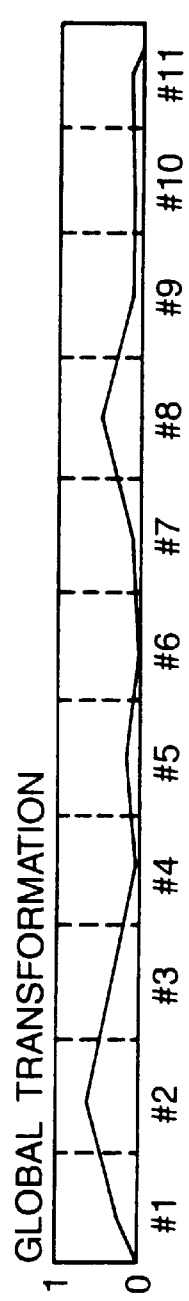
FIGS. 4a and 4b illustrate the effect of applying transformations to the profile pattern of FIG. 3b.
Figure 4B:
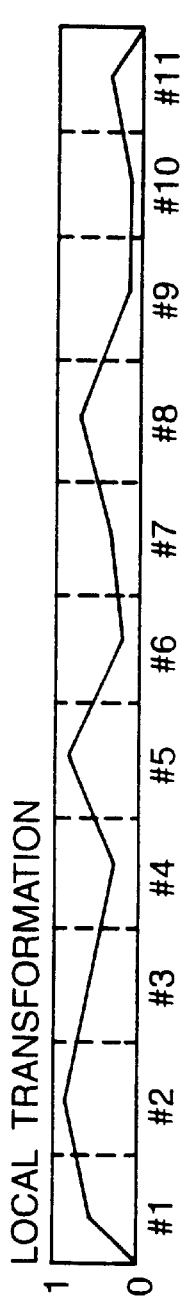

Transformations can be applied globally to change all the fields or locally to make one attribute more or less predominant. FIGS. 4a and 4b illustrate the effects of applying local and global transformations to attributes or fields of the pattern of FIG. 3b.

As discussed above, the processor uses the historic and new profiles to generate SOM profiles and MLP profiles.

A SOM profile is a measure of the change in behaviour of a user's calling habits. This is the difference between the historical profile and the new profile. Scaling may take place between the historical and new profile to produce a more pronounced output pattern. This may be used to improve the pattern recognition capabilities of the neural network, and is illustrated in FIGS. 5a to 5c which illustrate the derivation of a SOM profile from corresponding historical and new profiles for a customer.

An MLP profile for detection is a set or pair of historical and new profiles for a particular customer. An MLP profile for training is simply an MLP profile for detection with the inclusion of an extra binary field for each profile which indicates whether or not a fraud is being committed in that particular profile. A binary '1' denotes fraudulent activity otherwise the value will be '0'.

Figure 6:
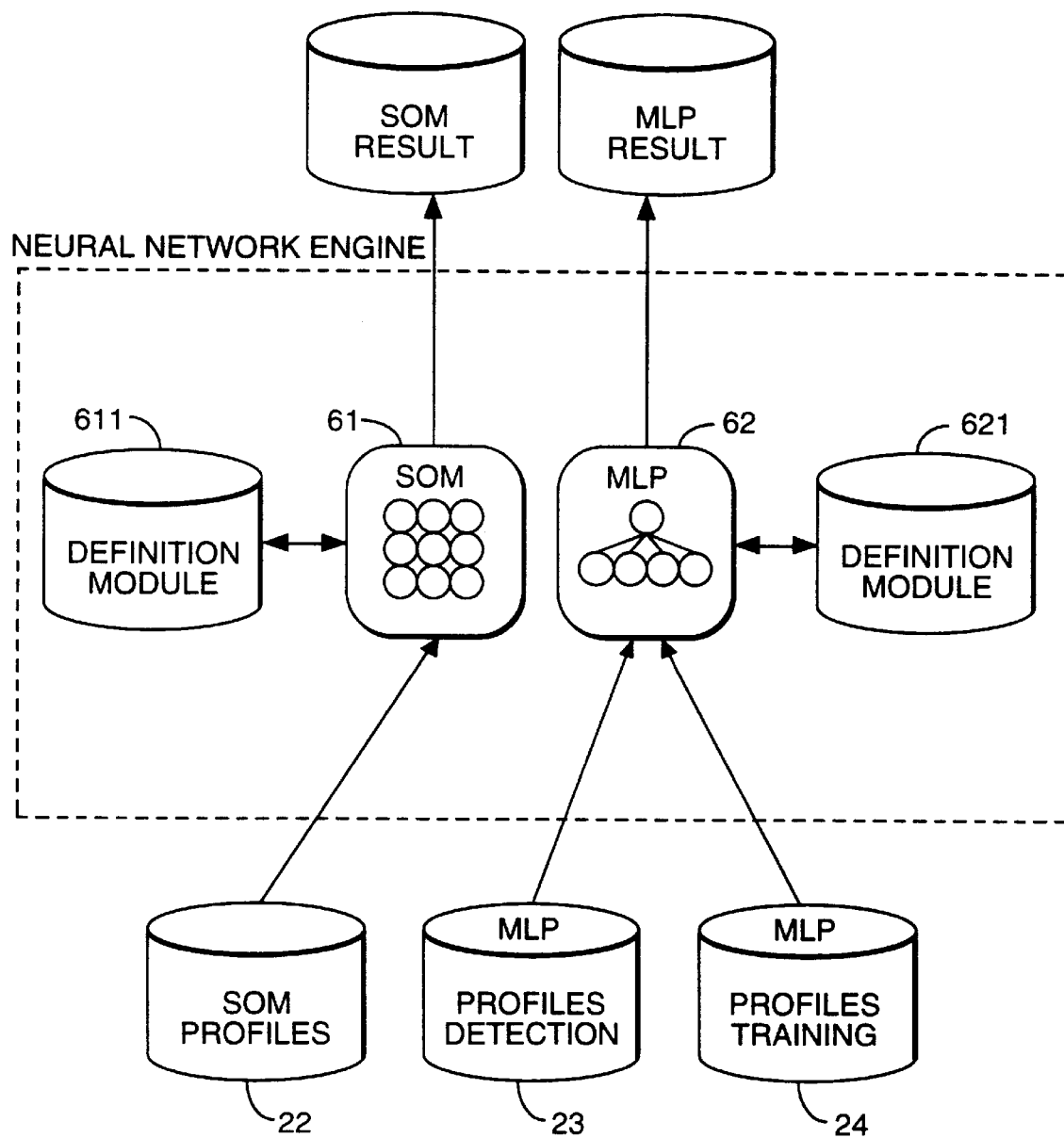
FIG. 6 shows the construction of a neural network engine for use in the arrangement of FIG. 1.

Referring now to FIG. 6, the neural network engine incorporates a self-organising map (SOM) 61 and a multi-layer perceptron (MLP) 62 each having a respective definition module 611, 621. SOM profiles 22 from the preprocessor are fed to the SOM 61. MLP detection profiles 23 and MLP training profiles 24 are fed to the MLP 62.

The neural network engine is a tool which recognises patterns of fraud from a set of account or customer profiles. The pattern recognition capabilities are determined by the architecture and input data.

The SOM 61 is a neural network architecture which discovers patterns in data by clustering similar types together. The data is grouped by the SOM without any prior knowledge or assistance which makes the types of patterns found highly dependent upon the input data presented. The SOM is used to classify the SOM profiles into groups representing types of legitimate and fraudulent patterns. Grouping is achieved by mapping the profiles on to points on a two dimensional plane, each point representing a group. A SOM is topology preserving which means neighbouring groups will share similar features.

The SOM operates in two phases, firstly the neural network learns the characteristics of the data upon which the model the groups. This is achieved by repeatedly presenting the set of profiles to the network until the classification of profiles to groups remains static. The number of potential groups is predetermined and reflects the diversity in the data. This is the training phase of the SOM. Once the group types have been established, unseen profiles can be presented to the network and will be classified accordingly. Each profile will be allocated to the group which it most closely resembles.

SOM Input

In both the learning and classifying stages the same type of input is used and comprises a set of SOM profiles from the preprocessor.

Although the network operates on unlabelled data some prior knowledge of cases of fraud is beneficial to assist in interpreting the data and optimising the pattern recognition capabilities. Table 1 below shows a SOM profile which is a set of user account profiles where #n denotes the field or attribute number.

TABLE 1

| | | | | | SOM Profile | | | | | |
|---|---|---|---|---|---|---|---|---|---|---|
| #1 | #2 | #3 | #4 | #5 | #6 | #7 | #8 | #9 | #10 | #11 |
| 0.4 | 0.67 | 0.6 | 6 | 2.5 | 0.9 | 0.56 | 5 | 2 | 0.7 | 11 |
| 0.5 | 0.9 | 0.56 | 3 | 4 | 0.8 | 0.2 | 1 | 3 | 0.1 | 10 |
| 0.1 | 0.7 | 0.1 | 1 | 9 | 0.34 | 0.76 | 18 | 3 | 0.56 | 14 |
| 0.3 | 0.2 | 0.3 | 7 | 1 | 0.2 | 0.3 | 4 | 2 | 0.2 | 12 |

SOM Output

The groups are represented by points in two-dimensional space. Each group will also have a set of characteristics associated with them that describe the group. The characteristics comprise the profile associated with that group. The output consists of the allocation of profiles to groups where each profile belongs to precisely one group. This is illustrated in Table 2 below and in FIG. 7 which shows the SOM neural network architecture in highly schematic form.

TABLE 2

| | SOM Output | |
|---|---|---|
| SOM Profile | Group | Group Profile |
| 0.56 0.34 . . . | 00010000 | 0.54 0.3 . . . |
| 0.4 0.2 . . . | 10000000 | 0.34 0.2 . . . |
| 0.7 0.4 . . . | 00000001 | 0.9 0.5 . . . |
| 0.3 0.4 | 01000000 | 0.23 0.44 . . . |

Figure 7:
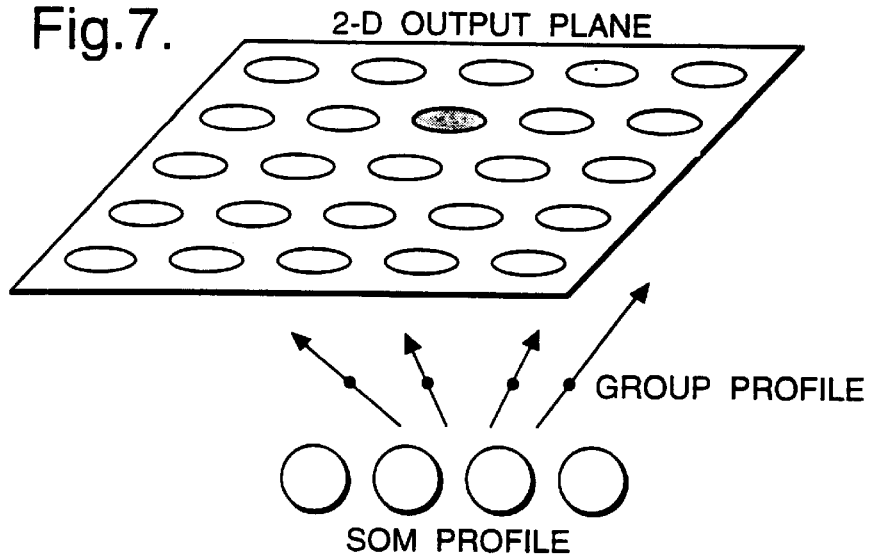
FIG. 7 illustrates the SOM neural network architecture of the neural network engine of FIG. 6.

In FIG. 7, the two dimensional plane represents the output space of the network where the groups are depicted by nodes. The SOM profile input is fed into the network and allotted to the output node it most resembles. The black node in FIG. 7 denotes the group type of the SOM profile. The groups characteristics are stored on the connections from the SOM profile to the Output Plane as indicated by the black dots.

The multi-layer perceptron (MLP) is used to give an indication of the likelihood of fraud occurring for each accounts holder or customer. The multi-layered perceptron is trained to recognise patterns from historical data containing known cases of fraud. Training is defined as showing the neural network a set of MLP profiles for training which includes the desired response of either legitimate or fraudulent. Once trained the neural network can then interpolate over unseen data.

The MLP has three modes of operation training, validation and detection each of which are discussed below.

Training is the process of teaching the neural network to recognise patterns. During this phase each profile is shown in turn to the neural network along with the desired response. For training we need data that we know about. We also need a large representative set of data to ensure that the neural network learns all the possible patterns. The process is repeated until the neural network has been successfully taught, this being measured by the amount of error between the neural network output and the desired response.

Validation is the process of checking that the neural network has learned successfully. Validation is much like training, but here the network is tested on previously unseen data where the desired response is already known to see how well the network has generalised. If validation fails the neural network must be retrained.

Once the MLP has been successfully trained it can then be used in a detection mode on unseen data to judge whether fraud is occurring for an account.

Figure 8:
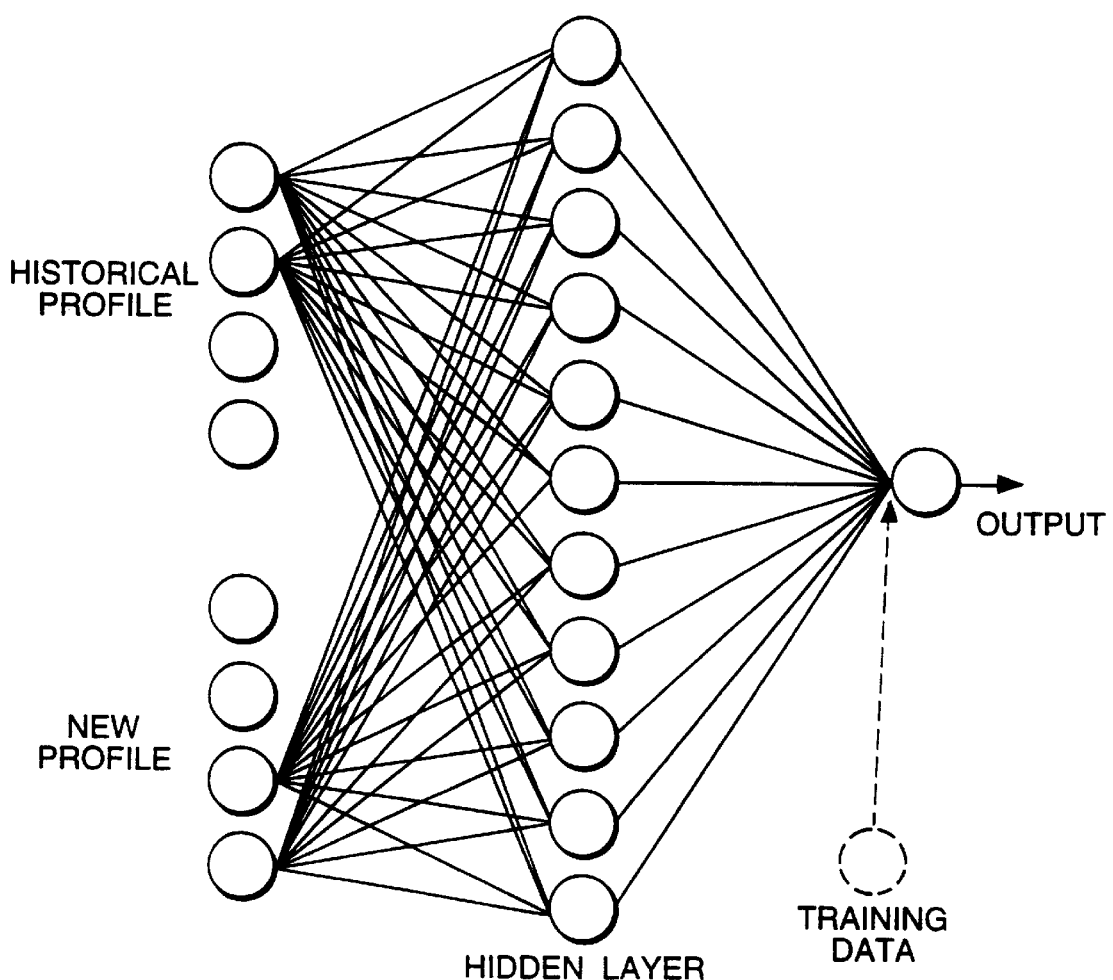
FIG. 8 illustrates the MLP neural network architecture of the neural network engine of FIG. 6.

FIG. 8 shows the neural network architecture of the MLP. The network takes either the MLP profile for training or an MLP profile for detection depending on the mode of operations. The output is a continuous value between 0–1 which is an indication of legitimate use or of fraud.

MLP Input

The input data for the MLP is a set of MLP profiles supplied by the preprocessor. In training and validation mode each record contains an additional field with the desired result. This extra field is a binary value where '1' denotes a fraudulent profile otherwise the value is '0'. This additional requirement is reflected in the MLP profile for training. Typical MLP training and detection profiles are illustrated in Tables 3 and 4 respectively.

TABLE 3

| MLP Profile for Training | | |
|---|---|---|
| Historical Profile | New Profile | Fraud Indication |
| 0.5 0.4 . . . | 0.4 0.3 . . . | 0 |
| 0.1 0.1 . . . | 0.9 0.8 . . . | 1 |
| 0.2 0.5 . . . | 0.3 0.45 . . . | 0 |
| 0.1 0.5 . . . | 0.2 0.4 . . . | 0 |

TABLE 4

| MLP Profile for Detection | |
|---|---|
| Historical Profile | New Profile |
| 0.5 0.4 . . . | 0.4 0.3 . . . |
| 0.1 0.1 . . . | 0.9 0.8 . . . |
| 0.2 0.5 . . . | 0.3 0.45 . . . |
| 0.1 0.5 . . . | 0.2 0.4 . . . |

MLP Output

The MLP output from the MLP network is a string of continuous valued numbers between '0' and '1'. Each number represents the likelihood of network abuse or fraud for the corresponding account holder. The closer the value is to '1' the stronger the indication of fraud. In training and validation mode the additional binary field containing the actual value will also be output to enable the performance to be evaluated. The MLP training output is illustrated in Table 5 and the detection output in Table 6.

TABLE 5

MLP Output for Training

| ACTUAL RESPONSE | DESIRED RESPONSE |
|---|---|
| 0.8 | 1 |
| 0.1 | 0 |
| 0.4 | 0 |
| 0.7 | 1 |

TABLE 6

Output for Detection

| ACTUAL RESPONSE |
|---|
| 0.8 |
| 0.1 |
| 0.4 |
| 0.7 |

The postprocessor shown in FIG. 9 provides the intermediary stage between neural network and the user interface. Its purpose is to translate the neural networks output into a meaningful and useful format. The postprocessing tasks include merging data from profiles, reversing mathematical functions applied by the preprocessor, sorting, filtering and saving the results to file.

Self Organising Map (SOM)

The SOM network clusters profiles of user accounts into groups in two dimensional space. This concept is illustrated in FIG. 10 in which the black circles represent group types and the grey dots denote the customer account profiles. A customer account profile will belong to the nearest group in the 2-Dimensional space, group boundaries are shown by the dotted lines. The output comprises the SOM profile and their associated group type as well as the characteristics of that group. From the group characteristics we can measure how closely the SOM profile matches that group. This measure serves as a certainty factor for groups which are found to be fraudulent. The output is merged with the user's billing account number to retain user details. The user account profiles are then listed by their group type and certainty factor within that group as illustrated in Table 7 below:

TABLE 7

Postprocessed SOM Output

| Billing Account No | Certainty Factor |
|---|---|
| GROUP A | |
| 001 | 0.98 |
| 002 | 0.9 |
| 003 | 0.78 |
| 004 | 0.72 |
| 005 | 0.69 |

TABLE 7-continued

Postprocessed SOM Output

| Billing Account No | Certainty Factor |
|---|---|
| GROUP B | |
| 006 | 0.94 |

The task is now to label groups in terms of legitimate accounts and types of fraud. One technique for identifying group types is to add profiles of known legitimate and fraudulent types to the input space. The resulting group can then be labelled accordingly. Unknown groups may represent new types of fraud. Once the data has been labelled the output can be used for fraud detection. Here, only fraudulent cases need to be listed. This list can then be saved to file.

Multi-Layered Perceptron (MLP)

The MLP network operates in training, validation or detection mode. In training or validation mode the neural network output is a set of actual and desired values. The actual values are calculated by the neural network and represent the degree of certainty of fraud occurring for that account holder. These are continuous values between '0' and '1'. The desired value is a binary value where '1' denotes fraud otherwise it is '0'. The output is used as a performance measure to judge how well the neural network has learned to recognise fraud. The performance measure is calculated from the average difference between actual and desired values. An acceptable error threshold needs to be set and if the measure falls outside this value then the neural network has not been trained successfully. The neural network should be validated on a set of data which is independent from the training set to test the generalisation capabilities. Table 8 below illustrates the calculation of the perceptron metric.

TABLE 8

Performance Metric

| Actual Value | Desired Values | Difference |
|---|---|---|
| $x_1$ | $y_1$ | $y_1 - x_1$ |
| $x_2$ | $y_2$ | $y_2 - x_2$ |
| · | · | · |
| · | · | · |
| · | · | · |
| $x_n$ | $y_n$ | $y_n - x_n$ |
| | | $\dfrac{\sum_{i=1}^{n}(y_n - x_n)^2}{n}$ |

Once the network has been successfully trained it can be used in detection mode. The output now contains the set of actual values. These actual values need to be merged with their corresponding user billing account number prior to processing to ensure the reference to the original users details is retained. The account profile can then be ordered in a list by the strength of the indication of fraud. A threshold can be optionally used to filter out less prevalent cases. Items at the top of the list should have highest priority for further investigation. This list can then be saved to file. An example of the list is given in Table 9.

TABLE 9

Postprocessed MLP Detection Output

| Bill Account No | Certainty Factor |
|---|---|
| 001 | 0.98 |
| 002 | 0.9 |
| 003 | 0.78 |
| 004 | 0.72 |
| 0.72 | 00 |
| 005 | 0.69 |

The arrangement described above may be incorporated in a network manager for a mobile telephone network. Alternatively it may be provided as a stand-alone arrangement which services a number of mobile networks.

We claim:

1. Apparatus for the detection of fraudulent use of a telephone subscriber's instrument in a mobile telephone system, the apparatus including means for determining a long term calling profile for a said subscriber, means for determining a short term calling profile for the subscriber, means for determining the difference between the long term and short term profiles, said difference comprising a subscriber profile pattern, and a trained neural net arrangement for determining from the subscriber profile pattern a probability value for the existence of fraud in that pattern, wherein the neural net arrangement comprises a self organising map adapted to effect pattern recognition of said subscriber profile patterns, and a multilayer perceptron adapted to determine said probability value for each recognised pattern.

2. Apparatus as claimed in claim 1, and including training means for providing said multilayer perceptron with subscriber profile patterns relating to predetermined frauds.

3. Apparatus as claimed in claim 1, wherein said long term and short term profiles comprise each a set of values determined for a respective set of call attributes.

4. Apparatus as claimed in claim 3, and including means for selectively scaling the difference between the long term and short term profiles whereby to accentuate the difference between the profiles for a subset of said attributes.

5. Apparatus as claimed in claim 1 wherein said self organising map is arranged to group said subscriber profile patterns into a plurality of groups such that similar patterns are placed in the same group.

6. Apparatus as claimed in claim 5, and including means for classifying said groups into types of legitimate use and fraudulent use.

7. Apparatus for the detection of fraudulent use of a telephone subscriber's instrument in a mobile telephone system, the apparatus including an input preprocessor, a neural network engine coupled to the preprocessor, and an output postprocessor coupled to the neural network engine, wherein the preprocessor is adapted to determine for each subscriber, from that subscriber's telephone call data, a first long term calling profile, a second short term calling profile, and a subscriber profile pattern comprising the difference between the first and second profiles, each said calling profile and subscriber profile pattern comprising a set of values for a respective set of call attributes, wherein the neural network engine comprises a self organising map trained to effect pattern recognition of said subscriber profile patterns and a multilayer perceptron adapted to determine for each recognised pattern a value indicative of the probability of a fraud being associated with that pattern, and wherein said postprocessor is arranged to order said recognised pattern according to said fraud probabilities.

8. A mobile telephone system provided with fraud detection apparatus as claimed in any one of claims 1 to 7.

9. A method for the detection of fraudulent use of a telephone subscriber's instrument in a mobile telephone system, the method including determining a long term calling profile for a said subscriber, determining a short term calling profile for the subscriber, determining the difference between the long term and short term profiles, said difference comprising a subscriber profile pattern, and processing the pattern via a trained neural net arrangement comprising a self organising map adapted to effect pattern recognition of said subscriber profile patterns and a multilayer perceptron adapted to determine said probability value for each recognised pattern whereby to determine from the subscriber profile pattern a probability value for the existence of fraud in that pattern.

10. A method as claimed in claim 9, wherein said long term and short term profiles comprise each a set of values determined for a respective set of call attributes.

11. A method as claimed in claim 10, wherein the differences between the values of the long and short term profiles are selectively scaled whereby to accentuate the difference between the profiles for a subset of said attributes.

* * * * *